June 1, 1965  J. RODWAY  3,186,518
CLOSED LOOP, SPOT-TYPE DISC BRAKES
Filed Jan. 22, 1964  3 Sheets-Sheet 1

INVENTOR
John Rodway
BY Winter, Ray, Adams &
Tockman ATTORNEYS

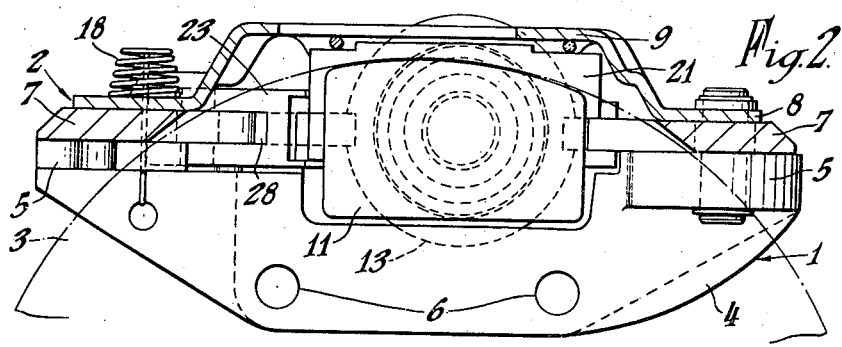
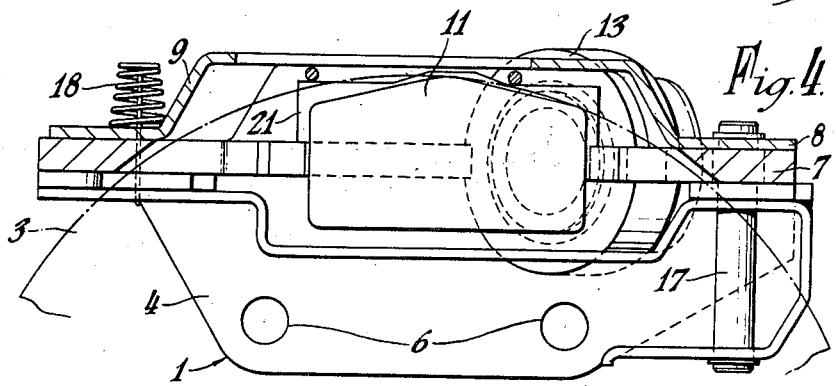
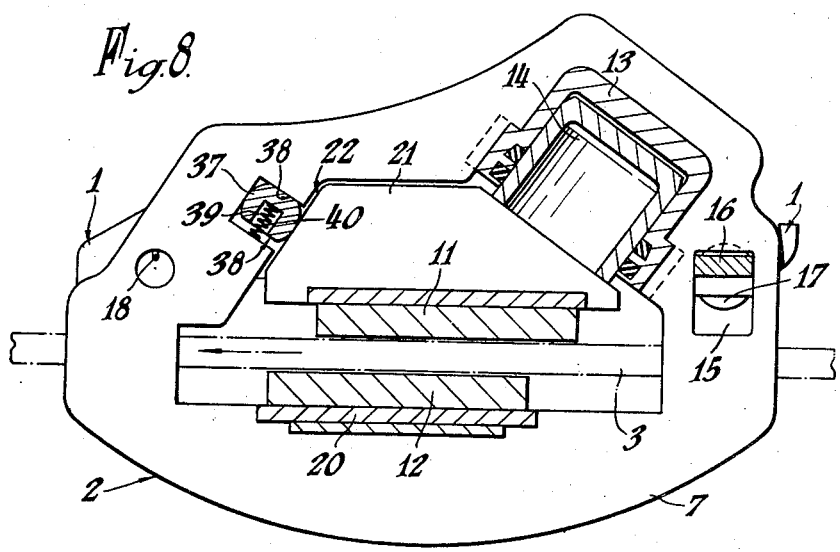

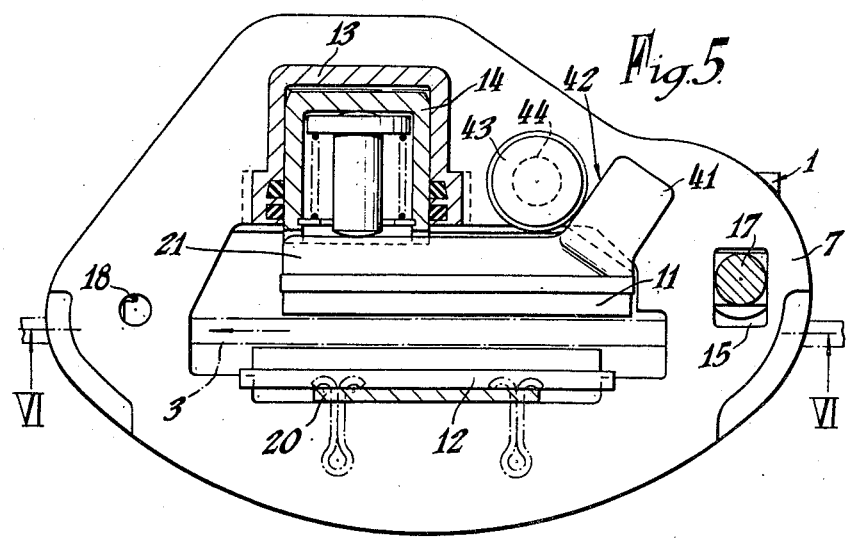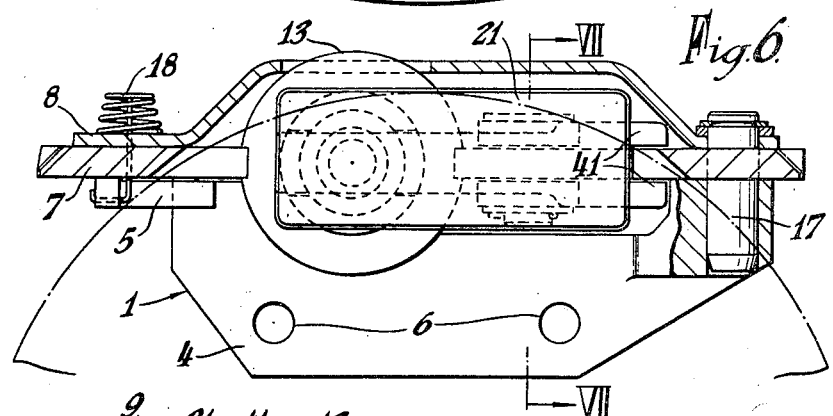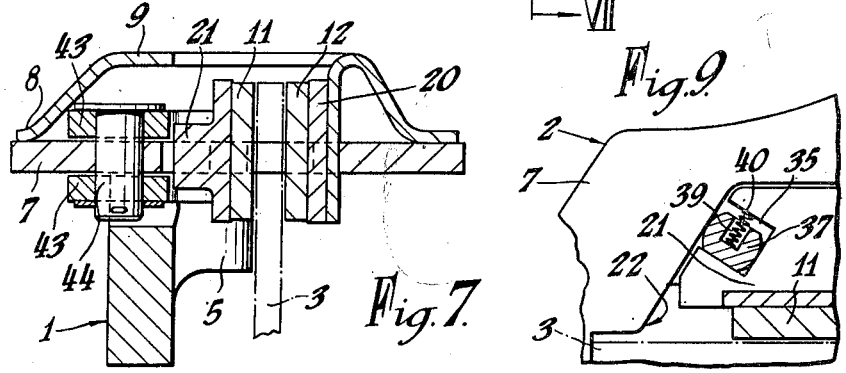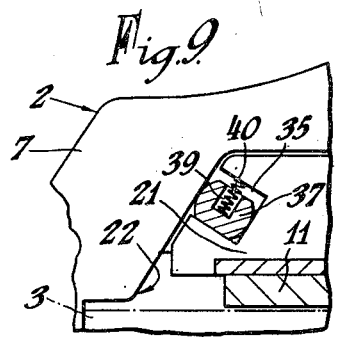

United States Patent Office 3,186,518
Patented June 1, 1965

3,186,518
CLOSED LOOP, SPOT-TYPE DISC BRAKES
John Rodway, Leamington Spa, England, assignor to Automotive Products Company Limited, Leamington Spa, England
Filed Jan. 22, 1964, Ser. No. 339,425
Claims priority, application Great Britain, Jan. 25, 1963, 3,320/63
8 Claims. (Cl. 188—73)

This invention relates to disc brakes of the kind in which a brake pad on one side of the brake disc is movable into contact with the brake disc upon actuation of brake actuating means on the same side of the brake disc, the reaction created resulting in movement of a movable member to bring a brake pad on the opposite side of the brake disc to said first mentioned pad, also into contact with the brake disc.

The object of the invention is to provide a construction of disc brake of the kind above referred to by means of which, under braking conditions, a wedging action is created between the brake pads and the brake disc, whereby increased effort is produced by the brake.

To this end, in accordance with the invention, it is proposed to provide means in a disc brake operable as a result of the displacement of a brake pad under the drag force created by contact of the brake pad with the rotating brake disc, to effect movement of the brake pad towards the brake disc to produce a wedging effect between the brake disc and pad. The said means may comprise for example, an arm mounted so as to be capable of pivotal movement in a plane normal to the plane of rotation of the brake disc, the arm providing an abutment disposed in the path of movement of a brake pad as the same is displaced under the drag force, engagement between the leading end of the brake pad or part associated therewith, and the abutment arm resulting in pivotal movement of the arm in a direction to cause the brake pad to move towards the brake disc with a wedging action. Alternatively the required effect can be obtained by means comprising an inclined surface associated with a brake pad the inclined surface co-operating with a further inclined surface associated with for example the movable member of the disc brake assembly, or with an abutment means, the inclined surface associated with the brake pad co-operating with said other inclined surface or abutment means during displacement of the brake pad under the drag force to cause the brake pad to move towards the brake disc. In this alternative arrangement, the co-operating inclined surfaces, or the inclined surface associated with the brake pad and the abutment means can be disposed either at the leading end of the brake pad or at the trailing end thereof, the terms "leading" and "trailing" being used in relation to the displacement of the brake pad under the drag force. The abutment means used in conjunction with an inclined surface associated with the brake pad preferably comprise a ball or roller whereby frictional effects are reduced.

The invention can be applied to a disc brake having brake actuating means mechanically operated and/or hydraulically operated. Advantageously the invention is applied to a disc brake having a movable member of closed loop construction. Accordingly embodiments of the invention as applied to a hydraulically operated disc brake of this kind will now be described by way of example with the aid of the accompanying drawings in which:

FIGURE 2 is a view on the line II—II in FIGURE 1.

FIGURE 4 is a view on the line III—III in FIGURE 3.

FIGURE 5 is a plan view partly in section, of a disc brake according to a still further embodiment of the invention.

FIGURE 6 is a view on the line VI—VI in FIGURE 5.

FIGURE 7 is a view on the line VII—VII in FIGURE 6.

FIGURE 8 is a plan view partly in section, of a disc brake according to another embodiment of the invention and FIGURE 9 is a fragmentary plan view partly in section, showing an alternative construction of the brake of FIGURE 8.

In each of the embodiments disclosed in the drawings the disc brakes are primarily of similar construction and accordingly a general description thereof will now be given the same reference numerals being used to denote corresponding parts of the brake mechanism.

Figure 1:
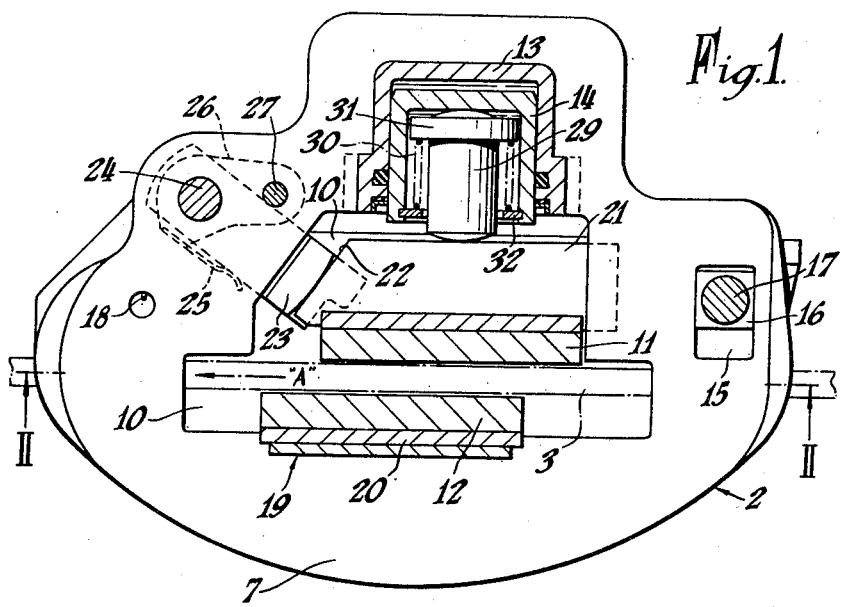
FIGURE 1 is a plan view partly in section, of a disc brake according to one embodiment of the invention.

Referring to the drawings the disc brakes shown each comprise generally a fixed support 1 and a movable member 2 carried by the fixed support so as to be capable of linear sliding movement theron in the direction of the axis of rotation of the brake disc 3 shown in chain-dot lines. The fixed support 1, made for example from sheet metal, has a bracket portion 4 having flange portions 5 extending laterally from one edge of the bracket portion and spaced apart from one another, the fixed support being adapted to be mounted on a fixed part of a wheel assembly by bolts passing through bolt holes 6 in the bracket portion of the support with the flange portions 5 extending at right angles to the plane of rotation of the brake disc 3. The flange portions 5 of the fixed support provide together a flat platform for the support of the movable member, corresponding flat surfaces of the movable member bearing against the flat radially outer surfaces of the flanges. The movable member 2 consists of two metal plates 7 and 8 placed one on top of the other and secured together by for example welding, to provide a unitary structure. The plate 7 is flat, the plate 8 having a raised portion 9 which extends over an opening 10 in the plate 7 said opening receiving a peripheral portion of the brake disc 3 and brake pads 11 and 12 arranged one on either side of the brake disc. The movable member 2 carries a hydraulic cylinder 13 adapted for connection in the hydraulic circuit of the vehicle braking system, the cylinder 13 being arranged on one side of the brake disc and having a piston 14 the outer end of which faces towards the brake disc.

The movable member 2 has a rectangular slot 15 to receive a squared shank portion 16 of a pin 17 carried by the fixed support, the pin projecting outwardly from one of the flange portions of the fixed support so as to extend parallel to the plane of the brake disc. The slot in the embodiment illustrated, extends at right angles to the plane of the brake disc the slot and pin being offset to one side of the axis of rotation of the brake disc and from the plane of the brake disc. The angle between the slot and the plane of the brake disc may be other than a right angle the said slot 15 being set substantially at right angles to the direction of the thrust applied to the pin 17 by the brake torque. A hold down spring 18 is provided at the opposite side of the movable member the spring acting between the said member and the fixed support to prevent "lifting" of the movable member. In operation outward movement of the piston 14 resulting from the admission of hydraulic liquid under pressure into the cylinder results in movement of the brake pad 11 into contact with the brake disc, the reaction force due to such contact causing linear sliding movement of the movable member in a direction opposite to the movement of the piston operated brake pad 11, the movable member being guided by the engagement between the sides of slot 15 and the squared shank of pin 17. This movement of the movable member causes the abutment, provided by the edge 19 of the opening 10 in the movable member, which edge bears against the metal backing plate 20 of brake pad 12 to move said brake pad towards the brake disc and into contact therewith whereby a braking action is obtained by hydraulic actuation of the brake.

In the embodiment of the invention disclosed in FIGURES 1 and 2 of the drawings, the hydraulic cylinder is arranged on the movable member 2 with the cylinder axis normal to the plane of the brake disc. The piston 14 is hollow, is open at one end and arranged in the cylinder open end outwards. A thrust rod 29 the opposite ends of which are spherical, extends between the closed end of the piston and a metal backing plate 21 of the brake pad 11, a compression spring 30 acting between a shoulder 31 on the thrust rod and a retaining ring 32 held in an internal groove adjacent the outer end of the piston urging the thrust rod inwardly into the piston to maintain the inner end of the rod in contact with the piston. The brake pad 11 which is associated with the hydraulic cylinder is supported so as to be capable of displacement under the action of the drag force created by contact of the pad with the brake disc 3. The brake pad metal backing plate 21 has one end formed to provide a surface 22 which is inclined to the plane of rotation of the brake disc, the surface sloping inwardly towards the axis of rotation of the brake disc from the edge of the metal backing plate closest to the brake disc. The inclined surface 22 is in contact with one end of an arm 23 which is pivotally mounted about its other end on a pivot pin 24 carried by the movable member 2, the pivot pin 24 being arranged so that the arm 23 is swingable in a plane parallel to the plane of movement of the movable member, the pivot pin also being positioned so that in the position of rest corresponding to "brake off" the longitudinal axis of the arm 23 extends at or substantially at right angles to the inclined surface 22 on the metal backing plate and to which position it is biassed by spring loading provided by a blade spring 25 carried by a support 26 also on the pivot pin 24 the support having a stop 27 limiting the movement of the arm 23 under the spring action. The arm 23 is slotted the slot 28 extending from the pivoted end and accommodating a portion of the plate 7 of the movable member whereby the arm is restrained against any tendency to lift during its pivotal movement.

The arrangement is such that upon displacement of the brake pad 11 by the drag force as the same contacts the rotating brake disc assumed to be rotating in the direction of arrow "A" in FIGURE 1, the arm 23 tends to swing in a direction towards the brake disc thus applying a load to the leading end of the brake pad 11, this load combined with the braking load provided by the piston of the hydraulic cylinder resulting in movement of the brake pad towards the brake disc, whereby a wedging action is obtained. During movement of the brake pad by the drag force the thrust rod 29 tilts so that the position at which the thrust is applied thereby to the brake pad is unchanged. Advantageously the end of the arm 23 in contact with the inclined surface is curved as shown to ensure smooth operation and prevent jamming.

Figure 3:
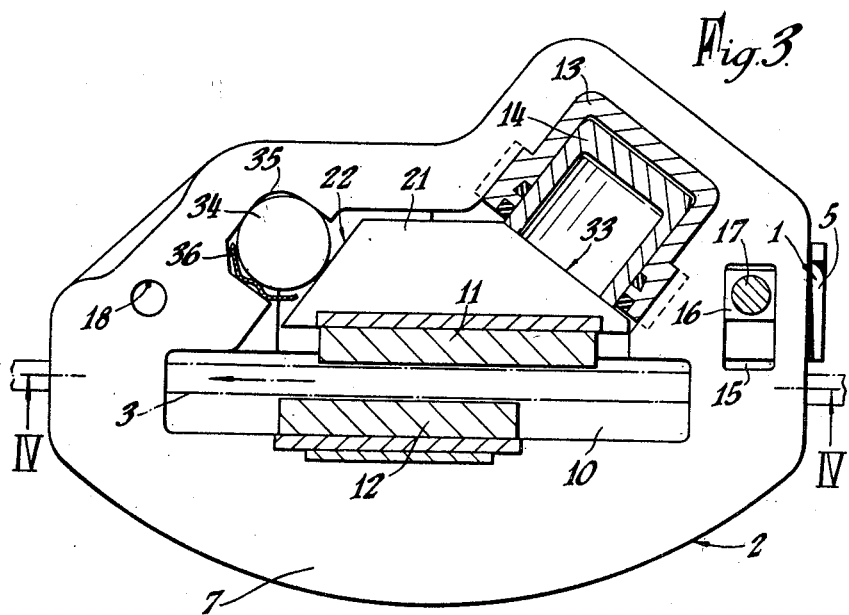
FIGURE 3 is a plan view partly in section, of a disc brake according to a further embodiment of the invention.

In the embodiment of the invention according to FIGURES 3 and 4 of the drawings the hydraulic cylinder 13 is arranged on the movable support 2 with its axis inclined to the plane of rotation of the brake disc 3 the outer end of the hollow piston 14 bearing against an inclined surface 33 formed on the end of the metal backing plate 11 opposite to the end having the inclined surface 22. The inclined surface 22 on the metal backing plate 11 is engageable with an abutment provided by the periphery of a ball or roller 34 disposed in a slot 35 in the movable member 2 of the disc brake.

In this arrangement, the slot 35 extends from an edge of the opening 10 in the movable member and is disposed with its axis at right angles to the inclined surface 22 of the metal backing plate, the ball or roller being trapped between a closed end of the slot and the inclined surface 22 of the metal backing plate. The slot 35 is of greater width than the diameter of the ball or roller, and the ball or roller is spring loaded by a leaf spring 36 the spring action urging the ball or roller to a position of rest at one side of the slot, from which position is is moved against the spring action during operation of the brake. When the braking load is released the ball or roller will be returned to the position of rest by the action of the spring thus preventing jamming. In an alternative construction of this embodiment it will be appreciated that the slot 35 can be formed in the metal backing plate 11 of the brake pad, the ball or roller in the slot co-operating with an inclined surface on the movable member 2 of the disc brake.

In a modification of the above described embodiment incorporating a roller and shown in FIGURE 8, a roller 37 is used the periphery of which has a pair of diametrically opposed, axially extending flats 38, the roller being arranged in the slot 35 with the flats facing opposite edges of the slot. The roller is spring loaded by a compression spring 39 received in a blind radial bore 40 in the roller the inner end of the spring abutting the bottom of the blind bore whilst the outer end abuts the opposite edge of the slot in which the roller is disposed whereby the roller is urged by the spring action to one side of the slot. FIGURE 9 of the drawings shows a similar arrangement but with the roller 37 in the slot 35 in the metal backing plate 11.

In all of the above described forms of the invention the means for applying the wedging action to the brake pad are disposed adjacent the leading edge of the brake pad. However it will be appreciated that such means can be otherwise arranged. For example the same can be disposed so as to be adjacent the trailing end of the brake pad as disclosed in the embodiment shown in FIGURES 5, 6 and 7 of the drawings.

In the form of the invention shown in FIGURES 5, 6 and 7 of the drawings the hydraulic cylinder 13 is arranged as in the construction of FIGURE 1 with the cylinder axis normal to the plane of rotation of the brake disc the spring loaded thrust rod being interposed between the hollow piston 14 and the metal backing plate 21 of the brake pad 11 actuated by the piston. In the present embodiment of the invention the metal backing plate 21 of the brake pad 11 associated with the hydraulic cylinder is formed at the end corresponding to the trailing end, with an outwardly projecting lug 41 one side of which is formed to provide a surface 42 which is inclined in relation to the plane of rotation of the brake disc 3, the surface inclining outwardly from its inner end to the axis of rotation of the brake disc. The inclined surface 42 is engageable with abutment means as the brake pad is displaced under the drag force. The abutment means comprises a pair of rollers 43 mounted on a pivot pin 44 supported by the plate 7 of the movable member 2, the rollers being disposed one on either side of the plate the pivot pin axis extending at right angles to the plate so as to be rotatable about an axis parallel to the plane of rotation of the brake disc.

In a brake according to the invention it will be appreciated that the hydraulic cylinder or other brake actuating means can be arranged so that the braking load is applied to the brake pad by the piston or other thrust member along a line of action at any suitable angle to the plane of rotation of the brake disc. However it is advantageous that such line of action should be at or substantially at right angles to the inclined surface of the means providing the wedging action as disclosed in connection with FIGURES 3 and 8 of the drawings. In a brake construction in which the piston or other thrust member is arranged to apply the braking load at right angles to the plane of rotation of the brake disc, as disclosed for example in FIGURES 1 and 5 of the drawings, advantageously means are provided to reduce or eliminate side loads on the piston or other thrust member created as a result of the displacement of the brake pad under the drag force. For example, the piston or other thrust member can be arranged so as to be capable of rocking movement, or an intermediate member, the thrust rod for example capable of movement relative to the piston or other thrust member, can be interposed between the brake pad and said piston or other thrust member.

For the most efficient actuation of a disc brake of the invention the directions and positions of the three forces acting on the pad, that from the cylinder, from the abutment and from the disc, must be concurrent for equilibrium. The centre of pressure of the pad lies where the disc force line cuts the disc surface. For parallel wear the pads should be symmetrically disposed about the centre of pressure.

A disc brake according to the invention has the advantage that the brake pads wear substantially parallel and uniform.

I claim:

1. A disc brake comprising a fixed support with a horizontal flange portion, a plate member slidably disposed on said flange portion comprising a closed loop with a central opening therein adapted to receive a brake disc therein, said closed loop plate member having a rectangular slot therein disposed at substantially a right angle with respect to the plane of a brake disc extending into said central opening, a pin carried by said flange portion of the fixed support with a square shank portion disposed in said rectangular slot, said pin and shank portion connecting said fixed support and closed loop member together to permit linear movement only with respect to each other and in a direction at a right angle with respect to the plane of a brake disc in said central opening, brake pads carried by said slidable loop member adjacent said central opening adapted to engage a brake disc therein, a brake pad backing plate disposed on one brake pad adjacent said central opening with an inclined surface, a piston carried by said slidable loop member and bearing against said backing plate for moving said one brake pad into contact with a brake disc when disposed in said opening, to cause linear sliding movement of the slidable member in a direction opposite to the movement of the piston operated brake pad, a thrust member carried by said slidable member adjacent said central opening and adapted to contact said inclined surface when a braking action is applied to produce a wedging action.

2. The brake of claim 1 wherein said thrust member is disposed adjacent the leading edge of the backing plate.

3. The brake of claim 1 wherein said thrust member is disposed adjacent the trailing edge of the backing plate.

4. The brake of claim 1 wherein said thrust member is an arm pivotally connected to said slidable member, and extending perpendicular to said inclined surface, swingable in a plane parallel to the direction of movement of said slidable member, said arm is slotted and straddles said slidable member, and biasing means urge it away from a brake disc disposed in the central opening.

5. The brake of claim 4 wherein said piston is hollow and is provided with a rod having spherical ends extending between the closed end of the piston and said backing plate.

6. The brake of claim 1 wherein said piston is disposed with its axis inclined to the plane of rotation of a brake disc extending into said central opening.

7. The disc brake of claim 1 wherein said thrust member is a ball member disposed in a groove in said slidable member.

8. The disc brake of claim 7 wherein said ball member has two oppositely disposed parallel sides and a blind bore with a biasing spring in said bore.

References Cited by the Examiner

UNITED STATES PATENTS

| 2,124,097 | 7/38 | Wolfram | 188—72 X |
| 2,957,553 | 10/60 | Chouings et al. | 188—73 |
| 3,141,527 | 7/64 | Henderson | 188—73 |
| 3,141,528 | 7/64 | Henderson | 188—73 |

FOREIGN PATENTS

| 1,142,643 | 4/57 | France. |
| 1,019,873 | 11/57 | Germany. |
| 829,866 | 3/60 | Great Britain. |
| 905,797 | 9/62 | Great Britain. |

ARTHUR L. LA POINT, *Primary Examiner.*

EUGENE G. BOTZ, *Examiner.*